E. PEKÁR.
Mode of Testing Flour.

No. 203,068.  Patented April 30, 1878.

Witnesses  
Chas H Smith  
Harold Serrell

Inventor  
Emmerich Pekar.  
per Lemuel W. Serrell  
Atty.

N. PETERS, PHOTO-LITHOGRAPHER, WASHINGTON, D. C.

UNITED STATES PATENT OFFICE.

EMMERICH PEKÁR, OF BUDAPEST, HUNGARY.

IMPROVEMENT IN MODES OF TESTING FLOUR.

Specification forming part of Letters Patent No. 203,068, dated April 30, 1878; application filed December 3, 1877.

*To all whom it may concern:*

Be it known that I, EMMERICH PEKÁR, of Budapest, in the Kingdom of Hungary, engineer, have invented a new and useful Method of Testing Meal and Flour, and apparatus therefor, which invention is fully set forth in the following specification, reference being had to the accompanying drawings.

Figure 1:
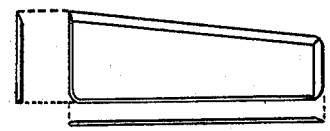
Figure 2:
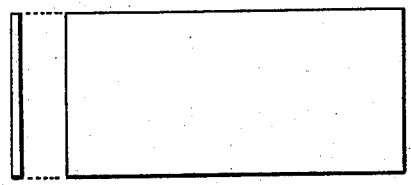

According to this invention, the flour which is to be tested is, by means of a flat distributing spatula or plate, which, by preference, is a flat taper piece of glass with two adjoining edges beveled, as shown in plan, side elevation, and end view at Figure 1, placed on a small dark board, (shown in plan and side view at Fig. 2,) which, by preference, is made about ten and a half inches long by five and a half inches wide, and of lime-wood, painted over three times with black or dark polish. The flour is evened on this board by means of the spatula, Fig. 1, and cut into portions—say one or two inches wide and three to three and a half inches high.

Figure 3:
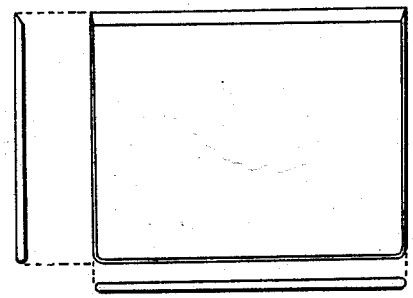

In this way several sorts of flour which have to be compared may be placed side by side. The flour on the board is then subjected to very hard pressure by means of a polishing-glass. (Shown at Fig. 3 in plan, side elevation, and end elevation.) This polishing-glass is partly pressed, partly pushed over the surface of the flour, and with an oscillating movement, so as to produce a smooth surface, the light falling evenly on it through the polishing-glass.

Figure 4:
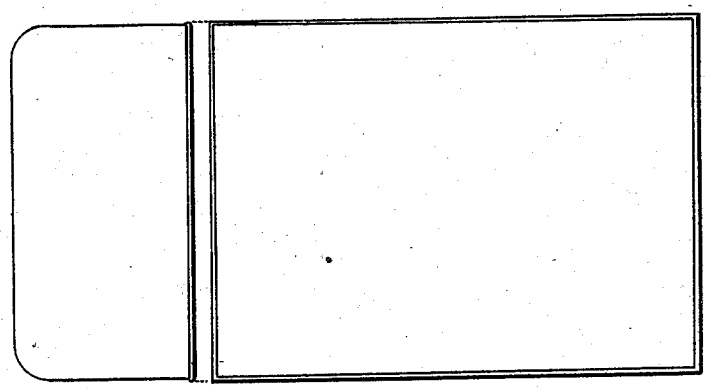

Already by this dry process or part of the process great differences become apparent, and one is enabled to judge well of the general quality and purity of the flour; but if these differences are to be heightened or made more apparent, and in order to judge of the quality of the flour, the board with the flour-samples is pushed into a glass dish, say four inches deep, (shown in plan and end view at Fig. 4,) and containing ordinary or distilled water; or, for special requirements—viz., for the more exact proof of presence of epidermis parts in the flour, about five per cent. of sulphuric or nitric acid may be added to the water.

It is well to hold the board as vertically as possible, in order to let the air-bubbles escape, without, however, letting the flour-samples glide off. After the lapse of some fifteen or twenty seconds the samples are removed from the dish, Fig. 4, by an oscillating or, so to say, rinsing movement, and placed in a slanting position, to enable the water to drain off.

Figure 5:

In order to prevent the samples from cracking in the drying, because the adhesion to the board prevents their even contraction, it is necessary to shave or cut down their edges with a ruler, such as shown at Fig. 5. Even while thus wet, the differences in apparently very similar or like flour-samples become exceedingly marked, and when dry they become even more so.

By this process is ascertained the quality of the wheat itself, as to its type or purity, and the quality of the work to which the wheat has been subjected in the manufacture into meal or flour, according to the more or less perfect arrangement of the mill and the greater or less skill and care of the miller.

I am aware that it is usual in testing flour to compare different samples, and that such samples have been pressed by a polished surface, such as an ivory spatula; but as soon as the pressure is relieved, in order to examine the flour, the particles of flour separate, and the compact condition is destroyed.

By my improvement I am enabled to retain the pressure upon the flour by the transparent polished glass while it is inspected, so that its character can be more accurately ascertained than by the methods heretofore pursued; and the glass being flat and the surface of the flour under uniform pressure, the reflected light acts with uniformity, and reveals any inequalities in the samples of flour under inspection, whether said samples are in a dry or a moist condition.

I claim as my invention—

The method herein specified of testing flour and meal, consisting in placing samples side by side upon a holder and subjecting them to pressure by a flat polished transparent glass, substantially as set forth.

EMMERICH PEKÁR.

Witnesses:
  FERDINAND BARBES,
    33 *Chancery Lane.*
  JNO. DEAN,
    17 *Gracechurch St., London.*